United States Patent [19]

Vignaud

[11] Patent Number: 5,718,946

[45] Date of Patent: Feb. 17, 1998

[54] INDUCTION HEATING SUBSTRATE FOR CERAMIC OR VITREOUS CERAMIC RECEPTACLES

[75] Inventor: Jacques Vignaud, Chauvingy, France

[73] Assignee: F. Deshoulieres (S.A.), France

[21] Appl. No.: 530,305

[22] PCT Filed: Jan. 10, 1995

[86] PCT No.: PCT/FR95/00159

§ 371 Date: Nov. 22, 1995

§ 102(e) Date: Nov. 22, 1995

[87] PCT Pub. No.: WO95/21802

PCT Pub. Date: Aug. 17, 1995

[30] Foreign Application Priority Data

Feb. 11, 1994 [FR] France ................... 94 01566

[51] Int. Cl.[6] ................. B05D 3/02; B05D 7/22

[52] U.S. Cl. ............. 427/226; 427/229; 427/230; 427/376.6; 427/404; 427/419.2

[58] Field of Search .................... 427/230, 229, 427/226, 404, 376.6, 419.2; 428/244

[56] References Cited

U.S. PATENT DOCUMENTS

| 4,385,082 | 5/1983 | Eichelberger et al. | 427/230 |
| 5,002,826 | 3/1991 | Pollart et al. | 428/323 |
| 5,155,316 | 10/1992 | Chiu | 219/10.491 |

*Primary Examiner*—Jancye Bell
*Attorney, Agent, or Firm*—Eckert Seamans Cherin & Mellott

[57] ABSTRACT

A method of placing a substrate that generates heat by induction on a ceramic or vitreous ceramic food receptacle. A single layer of electrically conductive and/or ferro/ferrimagnetic material is applied to the bottom of the receptacle on the inside or the outside and is subsequently fired.

4 Claims, No Drawings

INDUCTION HEATING SUBSTRATE FOR CERAMIC OR VITREOUS CERAMIC RECEPTACLES

The present invention relates to an induction heating substrate for a receptacle made of ceramic or of vitreous ceramic (porcelain, earthenware, terra cotta, brownware, etc.).

BACKGROUND OF THE INVENTION

Induction heating is becoming more and more widespread both in domestic cookers and in catering cookers, and it is tending to replace, in part, heating by transmission.

The coil of the induction top establishes an alternating magnetic field whose frequency generally lies in the range 25 kHz to 45 kHz. When heat production takes place, it relies on two different mechanisms depending on the properties of the materials concerned:

if the material is mainly electrically conductive, heating is due to eddy current generation, with the flow thereof giving rise to considerable Joule effect heating which is used for cooking or warming food;

if the material presents mainly magnetic properties (and in particular ferromagnetic properties), then it is dissipated magnetic energy that gives rise to heating.

The magnitude of the eddy currents is a function of the strength and the frequency of the external magnetic field. Also, the direction of the eddy currents is such that the magnetic field that they generate tends to oppose the external magnetic field, thereby preventing it from penetrating to the core of the conductor. This is known as the "skin effect" and the thickness of the material affected by eddy currents increases with deceasing frequency in the external field, so commercially available induction tops are of relatively low frequency.

Unfortunately, the ceramic materials that constitute a large fraction of receptacles for holding food are neither magnetic nor conductors of electricity. It is therefore not possible, a priori, to use them for induction heating.

Proposals have already been made in FR-A-2 671 709 to place a heat-conducting multi-layer film on a receptacle made of non-magnetic material in order to absorb electromagnetic waves and microwave energy. To this end, a layer 1 picks up heat from a layer 2 that absorbs energy from electromagnetic waves, with said layers being covered by a protective layer 3. The layer 2 is made of gold in the form of a paste, silver powder, and oil. The forming and depositing of those layers require a long series of operations.

GB-A-2 010 054 proposes a complete integrated cooking system in which the induction coil and the receptacle are included in a thermally insulated enclosure in order to limit heat losses from the receptacle.

OBJECTS AND SUMMARY OF THE INVENTION

An object of the present invention is to mitigate that drawback and to enable a magnetic and/or electrically conductive layer to be put into place in a single operation, as is the case for an enamel slip using a paintbrush or silkscreen printing, hot or cold pad printing. Deposition is preferably performed in the form of a transfer including the conductive substrate.

For the above reasons, it is not necessary for the layer deposited in this way to be ferromagnetic or ferrimagnetic in order for the receptacle to heat up; it suffices for it to be mainly a good conductor of electricity.

According to the invention, the method of manufacturing a receptacle of ceramic material capable of being heated by induction consists in depositing on the bottom of the receptacle by painting, silkscreen printing, or transfer, a thin layer of material possessing properties of conducting electrically and/or magnetic properties leading to the production of heat when exposed to an electromagnetic field.

Such deposition performed by a technique that is conventional in the field of ceramics may be performed either after optional decoration has been applied or simultaneously therewith. Only one additional firing operation may be required, and that does not significantly alter the traditional process whereby ceramic objects are manufactured and decorated.

According to another characteristic of the invention, the film capable of being heated by electromagnetic induction and applied to the bottom of the ceramic receptacle is electrically conductive or possesses magnetic properties, and in particular ferro-or ferrimagnetic properties.

When the layer is merely a conductor of electricity, it may have the following composition, for example: 58% to 83% by weight of metal powder; 2% frit, and the remainder being constituted by paste-forming solvents and resin.

The metal is selected from metals having low resistivity and a high melting temperature, e.g. silver. Other metals may also be suitable, given that the power evolved by the medium in which eddy currents are induced is governed by a relationship of the following form:

$$P_{watts} = F(\sqrt{\rho \mu_r f})$$

in which:

$\rho$ is the resistivity of the substance in $\mu\Omega.cm$ $\mu_r$ is the permeability of the medium f is the frequency of the electrical current in Hz.

Investigation by means of an optical microscope shows that bonding between the silver layer and the ceramic is essentially mechanical in nature. The surface silver penetrates into the pores of the crock or the layer of enamel. Its mean thickness lies in the range $25\mu$ to $35\mu$. The very low electrical resistivity of the layer is of the same order as that of pure silver, i.e. 2.5 $\mu\Omega.cm$ and does not exceed 2 $\mu\Omega.cm$ on the surface. The purpose of the resins and solvents is to enable the layer of metal to be applied to the porcelain. An outer protective layer is preferably deposited on the active layer.

When the conductive layer is based on silver, use is made of the low resistivity property of this material, but in addition to that property, the basic silver powder used is a powder having BET specific surface area lying in the range 1 square meter per gram ($m^2/g$) to 2 $m^2/g$, and particle sizes as follows:

100% of the silver grains are smaller than $12\mu$

50% of the silver grains are smaller than $3.9\mu$

10% of the silver grains are smaller than $1.5\mu$.

The film made from this powder is made up of small grains clustered around a mean diameter of $0.75\mu$ and lying in the range $0.15\mu$ to $30\mu$.

At ambient temperature, the resistivity of the layer is about 60 $\mu\Omega.cm$. As temperature rises, the expansion of the inter-grain sealing material moves the particles of silver apart and simultaneously enables the layer to expand at substantially the same rate as the backing, without giving rise to separation between the crock and the layer.

This expansion of the sealing material between the grains gives rise to a significant increase in the resistivity of the conductive layer until reaching a resistance that counters the effect of the induced current causing the heating.

Thus, by this means, the conductive layer can be temperature regulated to a temperature that is less than or equal to 100° C. by acting on the distribution and the thickness of said layer.

These dual properties make it possible to limit the temperature of the receptacle to a low value that is less than 100° C. but that is sufficient to keep food warm while protecting the ceramic receptacle from thermal shock that could break it, and this applies whatever the power setting of a commercially-available hob.

The manufacture of such a receptacle makes use solely of operations that are familiar in the porcelain industry. It does not alter the conventional process for manufacturing porcelain and it does not require any special equipment.

The conductive layer is deposited like conventional decoration and it is secured to the piece by being exposed to the temperature (840° C.) of a kiln for firing on decoration.

One of the advantages of the heating method consists in that a receptacle, such as a plate, can be warmed in full or in part. With a plate, if only the bottom of the plate is covered in a layer of the invention, then only the bottom warms up and the plate can easily be held by its rim, an exclusive method that completely satisfies both domestic and catering requirements.

With flat-bottomed "thermal" dishes, which merely need to be warmed or in which cooking is to be finished off at low heat, the absorbent layer is preferably deposited inside the receptacle, but still on the bottom thereof. Under such circumstances, it is essential to provide a protective layer (using an enamel type glass powder frit).

According to another characteristic of the invention, the ferri- or ferromagnetic deposited layer is constituted by a ferrite for example, iron-nickel-zinc or manganese-zinc or by alloys such as cobalt-samarium or by magnetic alloys of iron, or by other metals or ferromagnetic alloys.

Under such circumstances, it is known that such materials have a Curie point that is relatively low. This characteristic is used to regulate the heating temperature to a given value, e.g. 40° C., 60° C., or 70° C. depending on the Curie point. Such temperature regulation by selecting the Curie point of the applied layer is achieved by varying the ratio of the components making up the ferrite between material having strong magnetization and those having weak magnetization.

It has been observed that when such a receptacle is placed in a microwave oven, it does not produce any arcing in spite of having a conductive layer. This feature makes it possible to use a microwave oven for warming prepared foods without worrying about damaging the microwave generator because of electric arcing. To improve resistance to wear and corrosion by substances used in washing up, an enamel layer is deposited on the active film and provides covering and final protection after the stage of baking for attachment purposes.

The present invention also relates to a transfer process for implementing the method, in which a pattern made up of metal oxides, of powder of magnetic materials, of ferrites, or of a layer of electrically conductive material is provided on a sheet of varnish that sublimes at high temperature.

I claim:

1. A method of manufacturing a food receptacle out of ceramic material and capable of being heated by induction comprising, depositing a thin electrically conductive layer and a protective enamel layer at least one of on and in the bottom of the receptacle by at least one of painting, and printing, and then firing the electrically conductive layer and the protective enamel layer in a single operation at a temperature of about 840° C. so that the enamel covers the conductive layer and constitutes a protective layer in a single operation, wherein the electrically conductive layer has a thickness and comprises 52% to 83% by weight of metal powder, 2% frit, and a remaining percentage constituted by resin and solvents, the thickness of the electrically conductive layer lying in the range of 2.5μ to 35μ.

2. The method of claim 1, wherein the electrically conductive layer is a silver conducting layer having grains of silver with a diameter, and temperature regulation is accomplished by varying a resistivity of the silver conducting layer by expansion of a vitreous ceramic sealing material between the grains of silver in said silver conducting layer, the diameter of the grains of silver lying in the range 0.15μ to 30μ, with a mean diameter of 0.75μ.

3. A method of manufacturing a food receptacle out of ceramic material and capable of being heated by induction comprising, depositing a thin electro-magnetically conductive layer and a protective enamel layer at least one of on and in the bottom of the receptacle by at least one of painting, and printing and then firing the electro-magnetically conductive layer and the and the protective enamel layer in a single operation at a temperature of about 840° C. so that the enamel covers the conductive layer and constitutes a protective layer in a single operation, wherein the electro-magnetically conductive layer is ferro/ferrimagnetic, and an essential component of the electro-magnetically conductive layer being constituted by at least one of ferrite and a metal alloy.

4. The method of claim 3, wherein the electro-magnetically conductive layer has at least two components having a ratio, and temperature regulation is accomplished by selecting a Curie point of the electro-magnetically conductive layer by varying the ratio of the electro-magnetically conductive layer components between materials having different Curie points.

* * * * *

UNITED STATES PATENT AND TRADEMARK OFFICE
CERTIFICATE OF CORRECTION

PATENT NO. : 5,718,946
DATED : February 17, 1998
INVENTOR(S) : Jacques Vignaud

It is certified that error appears in the above-indentified patent and that said Letters Patent is hereby corrected as shown below:

Claim 1, column 4, line 11, after the word painting, delete ",".

Claim 3, column 4, line 34, after the word painting, delete ",".

Claim 3, column 4, line 35, after the word printing, insert --,--.

Claim 3, column 4, line 36, delete the second instance of "and the".

Signed and Sealed this

Seventh Day of July, 1998

Attest:

BRUCE LEHMAN

Attesting Officer

Commissioner of Patents and Trademarks